(12) United States Patent
Petersen et al.

(10) Patent No.: US 10,308,280 B2
(45) Date of Patent: Jun. 4, 2019

(54) HYDRAULIC STEERING

(71) Applicant: Danfoss Power Solutions ApS, Nordborg (DK)

(72) Inventors: Morten Hoeck Petersen, Rødekro (DK); Thomas Træger Hansen, Nordborg (DK); Thomas Bauer, Sydals (DK); Niels Bjarne Hansen, Aabenraa (DK); Jeroen Hinse, Sønderborg (DK)

(73) Assignee: Danfoss Power Solutions ApS, Nordborg (DK)

( * ) Notice: Subject to any disclaimer, the term of this patent is extended or adjusted under 35 U.S.C. 154(b) by 190 days.

(21) Appl. No.: 15/381,213

(22) Filed: Dec. 16, 2016

(65) Prior Publication Data
US 2017/0297617 A1    Oct. 19, 2017

(30) Foreign Application Priority Data
Apr. 13, 2016   (DE) .................. 10 2016 106 793

(51) Int. Cl.
| | |
|---|---|
| *B62D 1/22* | (2006.01) |
| *B62D 5/093* | (2006.01) |
| *B62D 3/14* | (2006.01) |
| *B62D 5/09* | (2006.01) |

(52) U.S. Cl.
CPC ............ *B62D 5/093* (2013.01); *B62D 1/22* (2013.01); *B62D 3/14* (2013.01); *B62D 5/09* (2013.01)

(58) Field of Classification Search
CPC ................................. B62D 5/093; B62D 1/22
USPC .......................................................... 60/386
See application file for complete search history.

(56) References Cited

U.S. PATENT DOCUMENTS

| | | | |
|---|---|---|---|
| 2009/0114469 A1 | 5/2009 | Thomsen et al. | |
| 2014/0216580 A1* | 8/2014 | Bauer ................. | B62D 5/093 137/596.18 |
| 2017/0072998 A1* | 3/2017 | Krahn ................. | B62D 1/22 |

FOREIGN PATENT DOCUMENTS

| | | |
|---|---|---|
| CN | 101172489 A | 5/2008 |
| CN | 104097686 A | 10/2014 |
| CN | 104144843 A | 11/2014 |
| DE | 10 2004 021 531 A1 | 9/2005 |
| DE | 10 2006 010 695 B4 | 5/2009 |
| EP | 3173311 A1 | 5/2017 |

* cited by examiner

*Primary Examiner* — F Daniel Lopez
*Assistant Examiner* — Daniel S Collins
(74) *Attorney, Agent, or Firm* — McCormick, Paulding & Huber LLP

(57) ABSTRACT

Hydraulic steering (1) is disclosed comprising a high pressure port (P), a low pressure port (T), two working ports (CL, CR), a manual steering section (3), and a steering valve section having a steering valve 5 and a hydraulic driving arrangement (6) adjusting hydraulically a position of said steering valve. A change from automatic steering to manual steering should be reliably ensured when the manual steering section is directly influenced by a driver. To this end, a switching valve (11) is provided, which is actuatable between a first position in which said driving arrangement (6) is supplied with hydraulic fluid under pressure, and a second position in which a supply of hydraulic fluid to said driving arrangement (6) is interrupted, wherein said switching valve (11) is hydraulically actuated into said second position by a pressure generated upon actuating of said manual steering section (3).

21 Claims, 2 Drawing Sheets

HYDRAULIC STEERING

CROSS REFERENCE TO RELATED APPLICATION

Applicant hereby claims foreign priority benefits under U.S.C. § 119 from German Patent Application No. DE102016106793.8 filed on Apr. 13, 2016, the content of which is incorporated by reference herein.

TECHNICAL FIELD

The present invention relates to a hydraulic steering comprising a high pressure port, a low pressure port, two working ports, a manual steering section, and a steering valve section having a steering valve and a hydraulic driving arrangement adjusting hydraulically a position of said steering valve.

BACKGROUND

Such a hydraulic steering is known, for example, from DE 10 2006 010 695 B4. Vehicles equipped with such a hydraulic steering can either be steered via the hydraulic steering valve in an automatic mode or they can be steered via the manual steering section, for example using steering means like a steering wheel.

When the vehicle is controlled via the hydraulic steering valve, the steering is performed automatically, for example by a control unit using the global positioning system (GPS). Such a functionality is, for example, important for agricultural vehicles.

The operator or driver of the vehicle is basically free to use the steering valve section or the manual steering section. To this end, a selection valve can be used with which the user can choose the appropriate mode of operation. However, for safety reasons it is important that the driver can also use the manual steering section to steer the wheels, for example, in emergency situations.

To this end, in DE 10 2006 010 695 B1 a steering wheel sensor is provided that can detect if the steering wheel has been turned by the driver.

However, the usage of a sensor on the steering wheel has the disadvantage that such a sensor is not always reliable and increases the costs of installation and maintenance of the hydraulic steering.

SUMMARY

The task underlying the present invention is to provide a hydraulic steering in which a change from automatic steering to manual steering can be reliably ensured when the manual steering section is directly influenced by a driver, for example by turning a steering wheel.

This object is solved with a hydraulic steering as described at the outset in that a switching valve is provided, which is actuatable between a first position in which said driving arrangement is supplied with hydraulic fluid under pressure, and a second position in which a supply of hydraulic fluid to said driving arrangement is interrupted, wherein said switching valve is hydraulically actuated into said second position by a pressure generated upon actuating of said manual steering section.

When the manual steering section is actuated, for example, by turning a steering wheel, a pressure is automatically generated. This pressure is necessary to actuate a steering motor which is connected to the working ports. This pressure or a pressure derived from this pressure can now be used to automatically change the position of the switching valve from the first position into the second position. In the second position the hydraulic drive arrangement for the steering valve is cut-off from a supply of hydraulic fluid so that the driving arrangement is no longer able to actuate the steering valve. In this situation the steering valve is no longer able to deliver hydraulic fluid under pressure to one of the two working ports, but the hydraulic fluid is delivered from the manual steering section only. Preferably said steering valve has means to move it into a neutral position when there are no external pressures driving the steering valve.

Preferably in said second position said switching valve connects a high pressure driving port of said hydraulic driving arrangement to said low pressure port. The hydraulic driving means are not only cut-off from a supply of hydraulic fluid. The high pressure driving port of the hydraulic driving arrangement is connected to the low pressure port which leads to the situation that the high pressure driving port and the low pressure driving port of the hydraulic driving arrangement are basically on the same pressure level. Therefore, no pressure difference can be generated over the steering valve.

Preferably in said second position said switching valve interrupts a connection between said steering valve and said working ports when said pressure is generated. Such an embodiment is of advantage in a case in which the steering valve needs some time to return into a neutral position. The switching valve interrupts a connection between the steering valve and the working ports so that even in this time no hydraulic fluid can reach the working ports from the steering valve.

Preferably said pressure acts on an auxiliary valve, said auxiliary valve establishes a connection between said manual steering section and said working ports when said pressure is generated. When the steering is performed exclusively by means of the steering valve the manual steering section is separated from the working ports by means of the auxiliary valve. The manual steering section is not loaded by pressure produced by the steering valve. However, when it is necessary to steer the vehicle by means of the manual steering section, the auxiliary valve establishes such a connection automatically.

In a preferred embodiment said steering valve comprises two driving ports, wherein each of said driving ports is connected to a return line via valve means opening in said second position of said switching valve. The driving ports are connected to the hydraulic driving arrangement as well. The hydraulic driving arrangement can be, for example, in form of a hydraulic bridge. When it is necessary to interrupt the operation of the steering valve, the pressure at the driving ports is automatically released so that the steering valve can return, for example, to a neutral position.

In this case it is preferred that said return line is connected to said low pressure port by means of said switching valve when said pressure is generated. When the pressure is generated, the switching valve is moved into the second position. In the second position it connects the return line to the low pressure port so that the driving ports of the steering valve are loaded with the pressure at the low pressure port which is usually the lowest pressure in the hydraulic steering. Preferably said valve means comprise for each driving port a check valve opening away from said driving port towards said return line. A check valve automatically assumes the appropriate operating condition. When the pressure at the outlet of the check valve is lower than at the inlet of the check valve, it opens. The check valve closes when the pressure relation is opposite. When the pressure in the return line is lowered to a low pressure, for example the pressure at the low pressure port, hydraulic fluid from the driving port opens the check valve so that it can escape to the return line.

Preferably said return line opens into a supply line of said driving arrangement, said supply line being connected to said low pressure port in the second position of said switching valve. This means that at least part of a line leading to the low pressure port can be used commonly to reduce the pressure in the return line and the pressure in the supply line.

Preferably said steering valve is connected to a position sensor, said position sensor being connected to control means, said control means comparing a given set-value and a position value detected by said position sensor. When the control means detect a difference between the set-value and the position value detected by the position sensor, the control means know that there is an "overriding" of the steering pressure by the manual steering section.

In a preferred embodiment said steering valve comprises means to return a steering valve element to a predetermined position range upon activation of said manual steering section. In this way it is possible that the control means recognize the position of the valve element inside the well-defined or predetermined position range. In this case the control means can detect that the manual steering section has been activated and automatic steering functionality, for example by a control unit using the Global Positioning System (GPS), can be stopped.

BRIEF DESCRIPTION OF THE DRAWINGS

Preferred embodiments of the invention will now be described in more detail with reference to the drawing, wherein.

DETAILED DESCRIPTION

Figure 1:
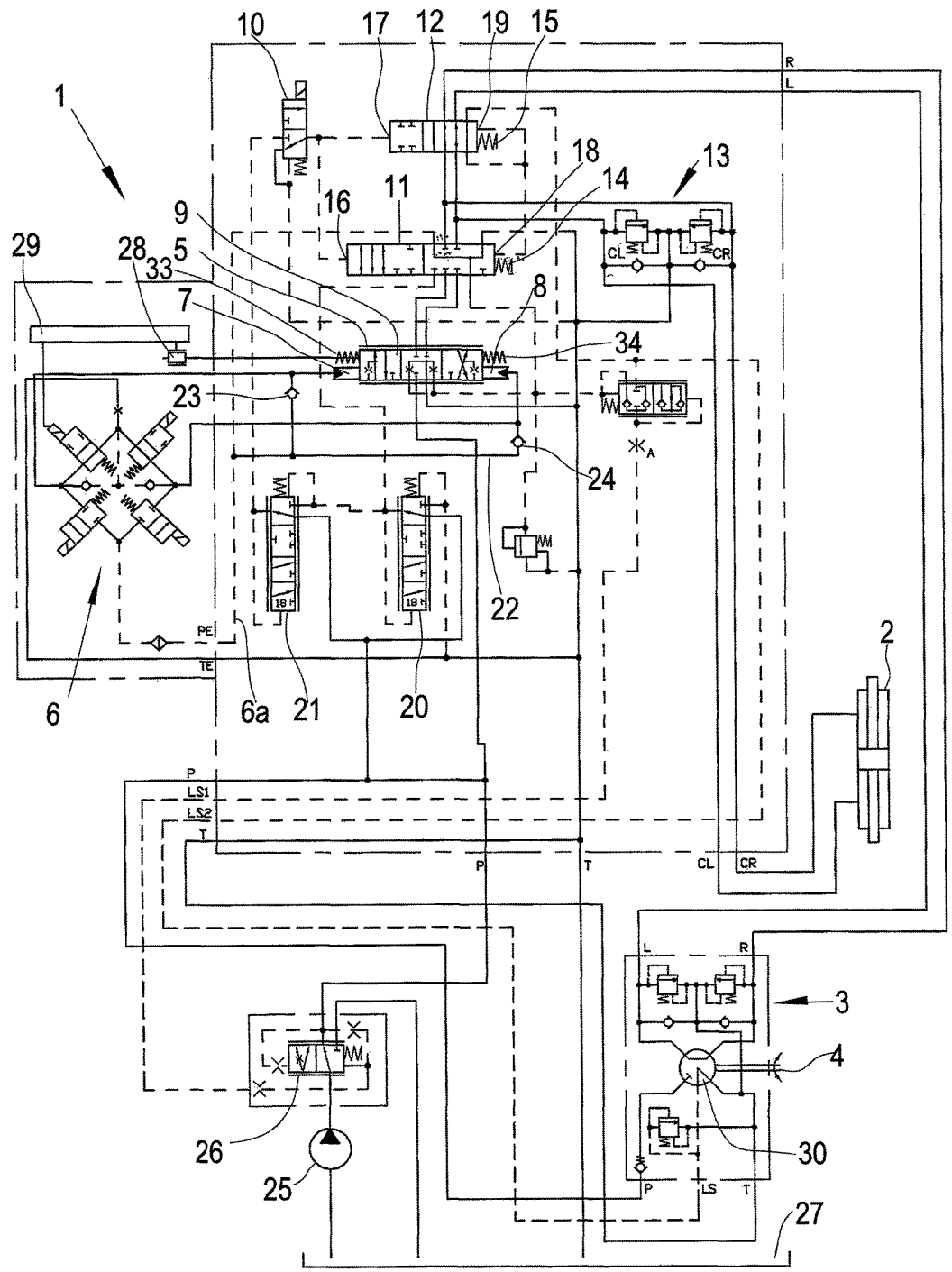
FIG. 1 is a schematic hydraulic circuit diagram of a first embodiment of a hydraulic steering and FIG. 2 is a schematic hydraulic circuit diagram of a second embodiment of the hydraulic steering.

FIG. 1 schematically shows a hydraulic circuit diagram of a hydraulic steering 1.

The hydraulic steering 1 comprises a high pressure port P, a low pressure port T, and two working ports CL, CR, which can be connected to a steering motor 2.

The hydraulic steering 1 comprises a manual steering section 3 which is known per se. The manual steering section 3 comprises a steering wheel axis 4 which can be rotated by means of a steering wheel (not shown). Upon rotating of the steering wheel axis 4 the steering motor 2 is actuated.

Furthermore, the hydraulic steering 1 comprises a steering valve section comprising a steering valve 5 and a hydraulic driving arrangement 6. The driving arrangement 6 can receive hydraulic fluid under pressure from a supply line 6a, as will be described later. The steering valve 5 comprises driving ports 7, 8 acting in opposite directions on a valve element 9 of the steering valve 5. The driving ports 7, 8 are connected to the driving arrangement 6. The driving arrangement 6 is in form of a hydraulic bridge having four branches arranged in form of a rectangle. In each branch a valve is mounted. One diagonal of the rectangle is connected to the driving ports 7, 8 and the other diagonal is connected to a high pressure port PE and a low pressure driving port TE. The low pressure driving port TE is connected to the low pressure port T.

Other forms of a hydraulic driving arrangement 6 are possible.

A selection valve 10 is provided with which the mode of operation can be selected by a driver. The operation of the selection valve 10 will be explained below.

A switching valve 11 is connected between the steering valve 5 and the working ports CL, CR. The switching valve 11 can be moved between a first position and a second position. FIG. 1 shows the second position.

The steering valve 5 is connected to the high pressure port P and to the low pressure port T. Depending on the position of the valve element 9, the steering valve 5 connects the high pressure port P to one of the working ports CL, CR and the low pressure port T to the other one of the working ports CL, CR provided that the switching valve 11 is in the first position.

An auxiliary valve 12 is arranged between the manual steering section 3 and the working ports CL, CR. The auxiliary valve 12 can be moved between a first position and a second position. FIG. 1 shows the second position of the auxiliary valve 12. In the second position the auxiliary valve 12 connects the manual steering section 3 to the working ports CL, CR. In the first position the auxiliary valve interrupts this connection between the manual steering section 3 and the working ports CL, CR.

A shock-and suction valve arrangement 13 is arranged between the two working ports CL, CR, as it is known.

The switching valve 11 comprises a switching valve spring 14 acting on the switching valve 11 to move it into the second position. The auxiliary valve 12 comprises an auxiliary valve spring 15 acting on the auxiliary valve 12 to move it into the second position.

The switching valve 11 comprises a first control port 16 connected to the selection valve 10. The auxiliary valve 12 comprises a first control port 17 connected to the selection valve 10 as well. The pressures at the control ports 16, 17 act in a direction opposite to said springs 14, 15.

The auxiliary valve 12 connects in each of the two positions a load sensing port LS of the manual steering section 3 to a second control port 18 of the switching valve 11 and to a second control port 19 of the auxiliary valve 12. The pressures at the second control ports 18, 19 act in the same directions as the forces of spring 14, 15.

The high pressure port P is connected to a first supply valve 20 and to a second supply valve 21. First supply valve 20 comprises an output which is connected to the switching valve 11. When the switching valve 11 is in the first position it connects the output of the first supply valve 20 to the supply line 6a of the high pressure driving port PE of the driving arrangement 6. When the switching valve 11 is in the second position (shown in FIG. 1) this connection is interrupted so that there is no supply of hydraulic fluid under pressure to the driving arrangement 6.

The driving port 7 of the steering valve 6 is connected to a return line 22 via a check valve 23 opening in a direction towards this return line 22. The other driving port 8 of the steering valve 5 is connected to the return line 22 via another check valve 24 opening towards the return line 22 as well.

The return line 22 is connected to the high pressure driving port PE of the driving arrangement 6. The return line 22 is connected to the supply line 6a.

This means that the return line 22 is on the pressure level of the output of the first supply valve 20 when the switching valve 11 is in the first position so that the check valves 23, 24 are automatically closed, and the return line 22 is on the pressure level at the low pressure port T when the switching valve 11 is in the second position (shown in FIG. 1), so that the check valves 23, 24 open automatically.

The second supply valve 21 connects the pressure port P to an input of the selection valve 11.

Both supply valves 20, 21 can be used to adjust an appropriate output pressure which is lower than the pressure at the pressure port P, since the pressure at the outputs of the supply valves 20, 21 is used for steering purposes only.

In a way known per se a pump 25 is connected via a priority valve 26 to the high pressure port P and the low pressure port T is connected to a tank 27.

The steering valve 5 is connected to a position sensor 28 which is in turn connected to control means 29 controlling the hydraulic driving arrangement 6.

The operation of the hydraulic steering 1 can be described as follows: When the selection valve 10 is in the position shown in FIG. 1 the actuation of the steering motor 2 is performed exclusively by means of the manual steering section 3. The steering valve 11 and the auxiliary valve 12 are both in their second position. There is no pressure (or only the pressure of the low pressure port T) at the first control ports 16, 17 and the force of the springs 14, 15 is greater than the force generated by the pressure at the control ports 16, 17.

When the selection valve 10 is actuated, it connects the output of the second supply valve 21 to the first control ports 16, 17 of the switching valve 11 and of the auxiliary valve 12 moving these two valves 11, 12 in their first positions.

As mentioned above, in the first position of the auxiliary valve 12 a connection between the manual steering section 3 and the working ports CL, CR is interrupted. A connection between the steering valve 5 and the working ports CL, CR is established by the steering valve 5. The control means 29 control the position of the steering valve 5 as desired, for example, in response to data obtained from a Global Positioning System (GPS).

When the selection valve 10 is in the position just described to select a steering mode performed by the steering valve 5 and the operator nevertheless operates the manual steering section 3, a pressure is generated at the load sensing port LS. This pressure automatically moves the auxiliary valve 12 in the second position shown in FIG. 1 and at the same time moves the switching valve 11 in the second position shown in FIG. 1 as well. This movement or switching of the switching valve 11 has the following effects:

The connection between the steering valve 5 and the working ports CL, CR is interrupted. Furthermore, a connection between the first supply valve 20 and the high pressure driving port PE of the driving arrangement 6 is interrupted and at the same time a connection between the high pressure driving port PE and the low pressure port T is established. This means that the hydraulic driving arrangement 6 does no longer receive hydraulic fluid under pressure so that the hydraulic driving arrangement 6 is no longer able to move the valve element 9 of the steering valve 5. The steering valve 5 is equipped with restoring springs moving the valve element 9 of the steering valve 5 into the neutral position. At the same time the pressure in the return line 22 and the pressure at the high pressure driving port PE are lowered to the pressure at the low pressure port T so that the check valves 23, 24 open to release the pressure at the drive ports 7, 8 of the steering valve 5. Such a release or "venting" establishes very fast the desired pressure conditions over the steering valve 5.

In the embodiment shown in FIG. 1 the manual steering section 3 comprises a closed center steering unit 30 or any other steering unit having a load sensing port LS.

Figure 2:
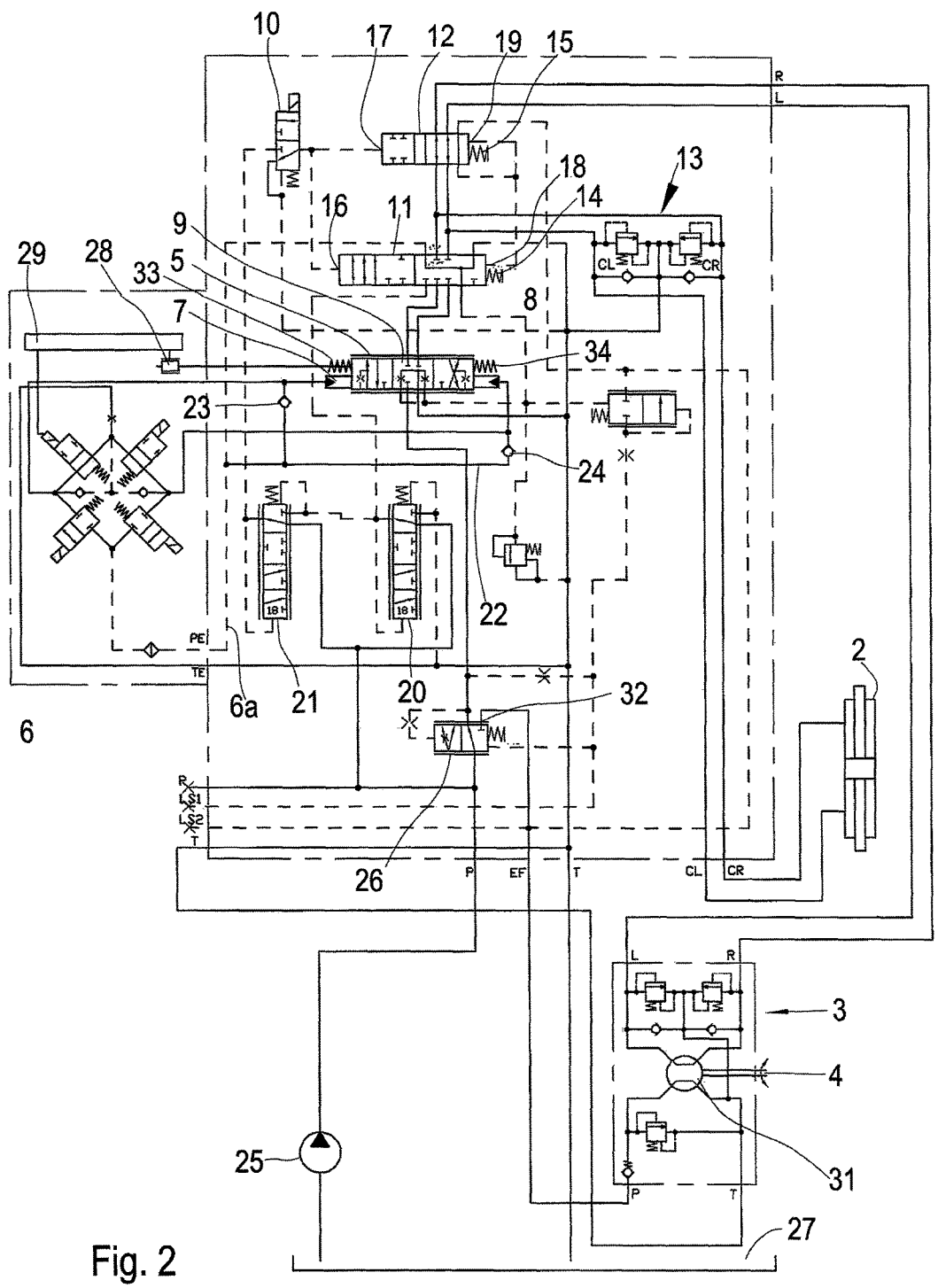

FIG. 2 shows an embodiment with a manual steering section 3 having an open center steering unit 31.

The same elements as in FIG. 1 are described with the same reference numerals.

The pump 25 is connected to the high pressure port P. A priority valve 26 is arranged between the high pressure port P and the steering valve 11.

When the open center steering unit 31 is in neutral position, there is a permanent flow from the high pressure port P to the low pressure port T of the manual steering section 3. When the steering wheel axis 4 is rotated, this flow is throttled so that a pressure at a second output 32 of priority valve 26 increases. The increased pressure reaches the second control ports 18, 19 of the switching valve 11 and of the auxiliary valve 12 to move them into the second position. The operation of this embodiment is the same as of the embodiment shown in FIG. 1.

In both embodiments, the steering valve 5 is connected to a position sensor 28. The position sensor 28 detects the position of the valve element 9 of the steering valve 5 and transmits this position value to control means 29. Control means 29 compares the position detected by the position sensor 28 with a set-value given by an automatic steering system, for example on basis of GPS-data. The control means controls the hydraulic driving arrangement 6 accordingly.

When the steering is taken over by the manual steering section 3, there will be a difference between the value detected by the position sensor 28 and the given set-value. This control means 29 detects that it is not possible to minimize this difference. This is a reliable indication that the steering is performed by the manual steering section 3.

The steering valve 5 comprises means 33, 34 to return the steering valve element 9 to a predetermined position range upon activation of said manual steering section 3. By having the control means 29 recognizing the position of the valve element 9 inside the well-defined or predetermined position range, activation of the manual steering section 3 can be said to have happened and automatic steering functionality, for example, by a control unit using the Global Positioning System (GPS), can be stopped.

The return means 33, 34 can be in form of springs, for example.

To avoid unclear situations, for example that the steering valve element 9 is in the neutral position and the control means 29 cannot decide if the manual steering section 3 has been activated, the steering valve element 9 is controlled to have a position some distance away from neutral position but without outputting any flow to the steering motor 2. If the steering valve element 9 is then put in real neutral position, the control means knows that the manual steering section has been activated.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A hydraulic steering comprising a high pressure port (P), a low pressure port (T), two working ports (CL, CR), a manual steering section and a steering valve section having a steering valve and a hydraulic driving arrangement adjusting hydraulically a position of said steering valve, wherein a switching valve is provided, which is actuatable between a first position in which said driving arrangement is supplied with hydraulic fluid under pressure, and a second position in which a supply of hydraulic fluid to said driving arrangement is interrupted, wherein said switching valve is hydraulically actuated into said second position by a pressure generated upon actuating of said manual steering section.

2. The hydraulic steering according to claim 1, wherein in said second position said switching valve connects a high pressure driving port (PE) of said hydraulic driving arrangement to said low pressure port.

3. The hydraulic steering according to claim 1, wherein in said second position said switching valve interrupts a connection between said steering valve and said working ports (CL, CR) when said pressure is generated.

4. The hydraulic steering according to claim 1, wherein said pressure acts on an auxiliary valve, said auxiliary valve establishes a connection between said manual steering section and said working ports (CL, CR) when said pressure is generated.

5. The hydraulic steering according to claim 1, wherein said steering valve comprises two driving ports, wherein each of said driving ports is connected to a return line via valve means opening in said second position of said switching valve.

6. The hydraulic steering according to claim 5, wherein said return line is connected to said low pressure port (T) by means of said switching valve when said pressure is generated.

7. The hydraulic steering according to claim 6, wherein said valve means comprise for each driving port a check valve opening away from said driving port towards said return line.

8. The hydraulic steering according to claim 6, wherein said return line opens into a supply line of said driving arrangement, said supply line being connected to said low pressure port in the second position of said switching valve.

9. The hydraulic steering according to claim 1, wherein said steering valve is connected to a position sensor, said position sensor being connected to control means, said control means comparing a given set-value and a position value detected by said position sensor.

10. The hydraulic steering according to claim 1, wherein said steering valve comprises means to return a steering valve element to a predetermined position range upon activation of said manual steering section.

11. The hydraulic steering according to claim 2, wherein in said second position said switching valve interrupts a connection between said steering valve and said working ports (CL, CR) when said pressure is generated.

12. The hydraulic steering according to claim 2, wherein said pressure acts on an auxiliary valve, said auxiliary valve establishes a connection between said manual steering section and said working ports (CL, CR) when said pressure is generated.

13. The hydraulic steering according to claim 3, wherein said pressure acts on an auxiliary valve, said auxiliary valve establishes a connection between said manual steering section and said working ports (CL, CR) when said pressure is generated.

14. The hydraulic steering according to claim 2, wherein said steering valve comprises two driving ports, wherein each of said driving ports is connected to a return line via valve means opening in said second position of said switching valve.

15. The hydraulic steering according to claim 3, wherein said steering valve comprises two driving ports, wherein each of said driving ports is connected to a return line via valve means opening in said second position of said switching valve.

16. The hydraulic steering according to claim 4, wherein said steering valve comprises two driving ports, wherein each of said driving ports is connected to a return line via valve means opening in said second position of said switching valve.

17. The hydraulic steering according to claim 7, wherein said return line opens into a supply line of said driving arrangement, said supply line being connected to said low pressure port in the second position of said switching valve.

18. The hydraulic steering according to claim 2, wherein said steering valve is connected to a position sensor, said position sensor being connected to control means, said control means comparing a given set-value and a position value detected by said position sensor.

19. The hydraulic steering according to claim 3, wherein said steering valve is connected to a position sensor, said position sensor being connected to control means, said control means comparing a given set-value and a position value detected by said position sensor.

20. The hydraulic steering according to claim 4, wherein said steering valve is connected to a position sensor, said position sensor being connected to control means, said control means comparing a given set-value and a position value detected by said position sensor.

21. The hydraulic steering according to claim 1, wherein the manual steering section comprises a load sensing port connected to the switching valve through an auxiliary valve, and wherein the pressure generated upon actuating of said manual steering section is generated at the load sensing port.

* * * * *